(12) United States Patent
Waldschmidt et al.

(10) Patent No.: US 10,067,267 B2
(45) Date of Patent: Sep. 4, 2018

(54) COATED GLASS OR GLASS CERAMIC ARTICLE

(71) Applicant: SCHOTT AG, Mainz (DE)

(72) Inventors: Holger Waldschmidt, Nieder-Wiesen (DE); Fabian Wagner, Mainz (DE)

(73) Assignee: SCHOTT AG, Mainz (DE)

( * ) Notice: Subject to any disclaimer, the term of this patent is extended or adjusted under 35 U.S.C. 154(b) by 51 days.

(21) Appl. No.: 15/054,199

(22) Filed: Feb. 26, 2016

(65) Prior Publication Data

US 2016/0252656 A1    Sep. 1, 2016

(30) Foreign Application Priority Data

Feb. 26, 2015 (DE) .................. 10 2015 102 743

(51) Int. Cl.
*G02B 1/10* (2015.01)
*C03C 17/23* (2006.01)
(Continued)

(52) U.S. Cl.
CPC .............. *G02B 1/10* (2013.01); *B23K 26/361* (2015.10); *C03C 3/00* (2013.01); *C03C 4/02* (2013.01);
(Continued)

(58) Field of Classification Search
CPC ....... C03C 2218/328; C03C 3/00; C03C 4/02; C03C 8/00; C03C 10/00; C03C 17/23;
(Continued)

(56) References Cited

U.S. PATENT DOCUMENTS 5,646,481 A * 7/1997 Zovko .................... H05B 33/12
                                                         313/506
5,824,374 A * 10/1998 Bradley, Jr. ............ G02B 5/201
                                                         205/136
(Continued)

FOREIGN PATENT DOCUMENTS

DE    102008031426 A1    1/2010
DE    102008031428 A1    1/2010
(Continued)

OTHER PUBLICATIONS

DIN EN 410, Apr. 1998, 46 pages.

*Primary Examiner* — Claude J Brown
(74) *Attorney, Agent, or Firm* — Ohlandt, Greeley, Ruggiero & Perle, L.L.P.

(57) ABSTRACT

A coated glass or glass ceramic article is provided that has a so-called "dead front" effect, where display features or icons are not visible in the off state. In some embodiments, the glass or glass ceramic article includes a sheet-like glass or glass ceramic substrate having two opposite faces, where the substrate exhibits, in a visible spectral range from 380 nm to 780 nm, light transmittance $\tau_{vis}$ of at least 1% for visible light that passes through from one face to the opposite face. An opaque coating on one face that exhibits, in the visible spectral range from 380 nm to 780 nm, light transmittance $\tau_{vis}$ of not more than 5%. An opening is provided in the opaque coating. The opening allowing light that is incident on the surface of the opaque coating to pass through the coating and through the glass or glass ceramic substrate. The opening has a width of not more than 80 μm at the glass or glass ceramic substrate.

20 Claims, 3 Drawing Sheets

(51) Int. Cl.
*F24C 15/10* (2006.01)
*C03C 3/00* (2006.01)
*C03C 4/02* (2006.01)
*C03C 8/00* (2006.01)
*C03C 10/00* (2006.01)
*F21V 33/00* (2006.01)
*B23K 26/361* (2014.01)
*F21K 9/60* (2016.01)
*G02B 27/20* (2006.01)
*F21Y 101/00* (2016.01)

(52) U.S. Cl.
CPC ............... *C03C 8/00* (2013.01); *C03C 10/00* (2013.01); *C03C 17/23* (2013.01); *F21K 9/60* (2016.08); *F21V 33/0044* (2013.01); *F24C 15/10* (2013.01); *C03C 2204/04* (2013.01); *C03C 2217/212* (2013.01); *C03C 2218/328* (2013.01); *F21Y 2101/00* (2013.01)

(58) Field of Classification Search
CPC . C03C 2204/04; C03C 2217/212; F21K 9/50; F21K 9/60; F21K 9/506; G02B 1/10; F21V 33/0044; F24C 15/10; B23K 26/361
USPC ......................................... 362/259
See application file for complete search history.

(56) References Cited

U.S. PATENT DOCUMENTS

| | | | | |
|---|---|---|---|---|
| 2001/0008234 | A1* | 7/2001 | Hasegawa | B41J 2/162 219/121.71 |
| 2003/0230017 | A1* | 12/2003 | Geyer | G09F 13/04 40/544 |
| 2007/0195537 | A1* | 8/2007 | Mayer | G02B 6/0028 362/362 |
| 2007/0295711 | A1* | 12/2007 | Striegler | C03C 8/18 219/448.11 |
| 2008/0035896 | A1* | 2/2008 | Striegler | C03C 10/0027 252/520.3 |
| 2010/0028629 | A1 | 2/2010 | Anton et al. | |
| 2010/0047556 | A1 | 2/2010 | Bockmeyer et al. | |
| 2010/0219176 | A1* | 9/2010 | Striegler | C03C 17/02 219/443.1 |
| 2011/0056815 | A1* | 3/2011 | Lust | C23C 14/042 200/314 |
| 2011/0095107 | A1* | 4/2011 | Clark | H01B 13/0026 241/24.12 |
| 2012/0041092 | A1* | 2/2012 | Bohannon | C09D 5/00 522/44 |
| 2012/0229882 | A1* | 9/2012 | Fish, Jr. | B60R 1/025 359/267 |
| 2013/0040116 | A1 | 2/2013 | Henze | C03C 1/008 428/201 |
| 2013/0323466 | A1* | 12/2013 | Baca | B08B 17/065 428/141 |
| 2015/0022994 | A1* | 1/2015 | Bingle | G01D 13/20 362/23.01 |
| 2015/0192780 | A1* | 7/2015 | Guo | G02B 5/005 359/462 |
| 2015/0228217 | A1* | 8/2015 | Perdices-Gonzalez | G09G 3/348 345/5 |
| 2015/0231738 | A1* | 8/2015 | Ota | B23K 26/381 219/121.71 |
| 2016/0103349 | A1* | 4/2016 | Park | G02F 1/133512 349/42 |

FOREIGN PATENT DOCUMENTS

| | | |
|---|---|---|
| DE | 102012103507 A1 | 10/2013 |
| EP | 0868960 B1 | 9/1999 |
| WO | 9925562 | 5/1999 |
| WO | 03020527 | 3/2003 |
| WO | 2011020721 A1 | 2/2011 |
| WO | 2013084120 A1 | 6/2013 |

\* cited by examiner

COATED GLASS OR GLASS CERAMIC ARTICLE

CROSS REFERENCE TO RELATED APPLICATIONS

This application claims benefit under 35 U.S.C. § 119(a) of German Patent Application No. 102015102743.7 filed Feb. 26, 2015, the entire contents of which are incorporated herein by reference.

BACKGROUND OF THE INVENTION

1. Field of the Invention

The present invention generally relates to glass or glass ceramic articles which are provided with an opaque coating. More particularly, the invention relates to such articles which are provided with light-emitting display elements or intended to be equipped with light-emitting display elements.

2. Description of Related Art

From the prior art, glass ceramic cooktops are known which are coated on their lower surface in order to modify the appearance and to conceal parts of the cooktop installed below the glass ceramic.

One option for this purpose are sol-gel coatings which are quite heat resistant and are distinguished by good adhesion to the glass ceramic plate. For concealing internal parts of a cooktop, opaque coatings are typically used.

For some applications it is desirable that the coating does not cover the entire surface but has windows. Such windows are in particular arranged in front of light-emitting display elements, so that these display elements shine through the glass ceramic plate to be visible to an operator which looks at the utilization side of the cooktop. Partly, these windows are covered by translucent coatings to improve aesthetic appearance. With the same hue, a homogeneous surface is created in this manner.

Nowadays, icons, characters, or other logos and designs are printed on cooktops by screen printing. However, it is difficult in this case to produce very fine patterns such as thin lines, for example.

Moreover, concerning screen printing, reproducibility is difficult in areas of very fine resolution or runouts of lines due to the screen printing mesh. Furthermore, for every new product request or design change a new screen needs to be created, so that set-up costs are very high, which is especially noticeable in small series. Manufacturing of individual designs for each end user is therefore expensive.

Furthermore, as to multilayer coatings, in case of a printing technique such as screen printing the problem arises that congruent patterning is difficult. Therefore, in case of multilayer coatings usually a larger window is omitted, to allow to pattern a further coating layer with exactly the desired pattern in the area of the window. However, especially in combination with light-emitting display elements the window might be visible if the more precisely patterned coating layer is not completely opaque.

EP 0 868 960 B1 discloses a method for manufacturing control panels, in particular for electrical household appliances, wherein at least one personalized laser engraving is produced in at least one screen printed layer which has previously been applied to a basic panel blank, the engraving consisting in material removal so as to form decorative features, icons, or similar signs in the screen printed layer, and then these engravings are covered by manually or automatically applying a layer of different color, which may be effected immediately after the engraving step or in a separate operation.

With regard to design aspects, it would moreover be especially desirable that the windows in the coating, which allow the light from the display elements to pass therethrough are as visually inconspicuous as possible. A seemingly homogeneous surface in which the display features are invisible in the off state would be ideal.

SUMMARY

Therefore, an object of the invention is to provide a glass or glass ceramic article which appears opaque to an observer or at least comprises opaque areas, but yet allows light from display elements to pass and to be clearly visible. In other words, the invention intends to provide a so-called "dead front" effect in which the display features or icons to be displayed are not visible for an operator in the off state.

Accordingly, the invention provides a glass or glass ceramic articles, comprising: a sheet-like glass or glass ceramic substrate having two opposite faces, which in the visible spectral range from 380 nm to 780 nm exhibits light transmittance $\tau_{vis}$ of at least 1%, preferably at least 30% for visible light which passes through the glass or glass ceramic substrate from one face to the opposite face; wherein one face of the glass or glass ceramic substrate has a coating which in the visible spectral range from 380 nm to 780 nm exhibits light transmittance $\tau_{vis}$ of not more than 5%, and wherein an opening is provided in the opaque coating, which allows light that is incident on the surface of the coating to pass through the coating and through the glass or glass ceramic substrate; wherein the opening has a width of not more than 80 µm, preferably not more than 40 µm. Due to the low transmittance of not more than 5% the coating is opaque.

Such a glass or glass ceramic article is produced by providing a sheet-like glass or glass ceramic substrate having two opposite faces, which in the visible spectral range from 380 nm to 780 nm exhibits light transmittance $\tau_{vis}$ of at least 1%, preferably at least 30% for visible light which passes through the glass or glass ceramic substrate from one face to the opposite face; wherein one face of the glass or glass ceramic substrate is provided with an opaque coating which in the visible spectral range from 380 nm to 780 nm exhibits light transmittance $\tau_{vis}$ of not more than 5%; wherein a pulsed laser beam is directed to the opaque coating and the coating is locally removed by ablation down to the surface of the glass or glass ceramic article thereby producing an opening in the opaque coating, which opening has a width of not more than 80 µm, preferably not more than 40 µm, more preferably not more than 25 µm toward the glass or glass ceramic substrate or at its substrate end. Preferably, the opaque coating is directly applied to the substrate. However, it is also conceivable that an intermediate layer is provided between the substrate and the coating, for instance to improve adhesion of the opaque coating to the substrate.

Light transmittance $\tau_{vis}$ can be determined with a standard illuminant D65 according to DIN EN 410.

The width of the opening is so small that the opening is visually inconspicuous to an observer as long as no light source is switched on at the side opposite the viewed side. Should the opening still be recognizable with the naked eye at all, reflections of ambient light at the substrate surface and at the interface to the opaque coating are predominating, because of the width and the upper limit of transmittance of the coating mentioned above. On the other hand, light transmission through the opening decreases with decreasing width thereof. For creating backlit display features that are still well perceptible, it is therefore preferable that the width of the opening at the glass or glass ceramic substrate is at least 0.5 µm.

However, when a light source is turned on, which is otherwise hidden for a viewer by the opaque coating, the light passing through the opening will be clearly visible for the viewer. Moreover, surprisingly, due to the high contrast between the penetrating light and the rest of the surface appearing darker because of the opacity, the contours of the opening are outshined and the feature created by the opening seemingly has a greater width than the actual width of not more than 80 µm, preferably 40 µm or less, more preferably not more than 25 µm. The fact that the features appear larger or wider in the transmitted light may as well be attributed to diffraction effects occurring due to the small width. According to yet another embodiment, brightness control may additionally be provided for the light-emitting element intended for illumination. Such brightness control may serve to change the apparent width of the display feature, but also to signal a specific value such as the heating stage of a cooking zone.

DESCRIPTION OF THE DRAWINGS

The invention will now be described in more detail with reference to the accompanying figures. In the figures, the same reference numerals designate the same or equivalent elements. In the drawings.

DETAILED DESCRIPTION

Figure 1:
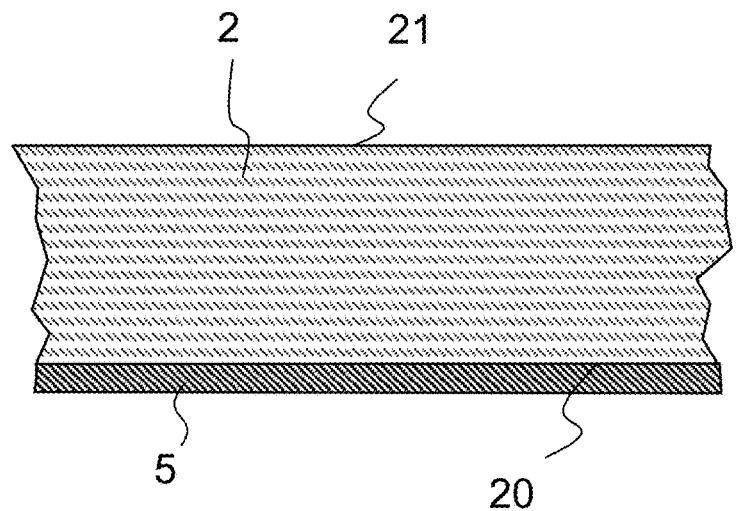
FIG. 1 shows a coated glass or glass ceramic article.

For producing a glass or glass ceramic article according to the invention, initially a planar or sheet-like glass or glass ceramic substrate 2 is provided. Accordingly, the glass or glass ceramic substrate 2 has two opposite faces 20, 21. One of the faces is provided with an opaque or light non-transmissive layer 5, in the example shown in FIG. 1 this is face 20.

Particularly preferred coatings 5 are inorganic and/or inorganic-organic sol-gel coatings which form an oxidic network and contain decorative pigments, or which form a matrix of such an oxidic network with embedded decorative pigments after curing. Most preferred oxidic networks are $SiO_2$ networks, or a $SiO_2$ matrix. Optionally, the network may still contain organic radicals. However, the coating 5 is yet inorganic or at least predominantly inorganic. The decorative pigments are preferably inorganic as well.

Such coatings are highly durable and temperature resistant and can be produced in an almost unlimited number of different visual appearances, depending on the choice of the decorative pigments. However, the patterning of such coatings is a problem, especially if they contain a high proportion of pigments, or if the individual pigment particles are rather large. The latter is for instance the case when platelet-shaped decorative pigments are used to produce metallic or glitter effects. The inventive method even permits to sever the individual pigment particles and to cut them exactly.

The decorative pigments and their content in the coating composition are selected so that with the intended layer thickness of the coating 5 the latter has a transmittance in the visible spectral range of less than 5%. Optionally, such low transmittance may be achieved by a multi-layer coating as well.

Suitable coating compositions and coatings prepared therefrom are known, inter alia, from DE 10 2008 031 426 A1, and from DE 10 2008 031 428 A1, and the content disclosed therein concerning such coating compositions and coatings is hereby fully incorporated into the subject matter of the present application. Accordingly, in one embodiment of the invention an opaque coating is produced in the form of a sealing layer for decorative layers, wherein in a first step the decorative layer is produced by a sol-gel process, which layer is applied on the glass or glass ceramic substrate and cured by baking, and in a second step the decorative layer is covered by a sealing layer which is also produced by a sol-gel process, in which inorganic decorative pigments and fillers are mixed with a sol, wherein the inorganic decorative pigments comprise platelet-shaped pigment particles and inorganic solid lubricant particles which are added in a ratio ranging from 10:1 to 1:1 wt %, preferably from 5:1 to 1:1 wt %, and more preferably from 3:1 to 1.5:1 wt %, and wherein the prepared mixture is applied to the glass ceramic substrate provided with the cured decorative layer and is then cured at elevated temperatures. The cured sealing layer may have the same composition as the cured decorative layer, with the difference that in terms of the number of organic radicals the metal oxide network of the sealing layer has more organic radicals than the metal oxide network of the decorative layer, preferably at least 5% more organic radicals. Metal oxide network herein also refers to an oxidic network including elements which are semiconducting in elemental form (i.e. in particular the $SiO_2$ network already mentioned, inter alia).

Unlike described before, other sealing layers may likewise be used. In addition to the sol-gel sealing layers described above, silicone layers or silicone-based layers are for instance suitable to seal an underlying coating. Optionally, plastics may be used as well.

Also, ceramic inks may be used on the face, which are specifically adapted to the requirements of a ceramic lower surface coating. A preferred embodiment of this invention are hybrid layers, as described in DE 10 2012 103 507 A1.

After producing the coating 5, an opening 9 is created by means of an apparatus for laser ablation. An example of such an apparatus 11 is shown in FIG. 2.

The apparatus for laser ablation 11 comprises a laser 71 and a device for guiding the laser beam 7 produced by the laser 71 across the surface 20 of the glass or glass ceramic substrate 2 coated with a coating 5. The device employed for guiding the laser beam 7 over the surface may for example be a galvanometer scanner 15.

For some applications it is desired to produce recesses with a shape of long straight lines, for example in cooking plates in which such lines are intended to delineate a cooking area or to mark a cooking zone. For long straight lines it is advantageous to use a polygon scanner, because in stitching long lines a small offset may quickly occur. Due to the offset the line becomes wider at the interface and therefore would appear much brighter at this point in the transmitted light.

Figure 2:
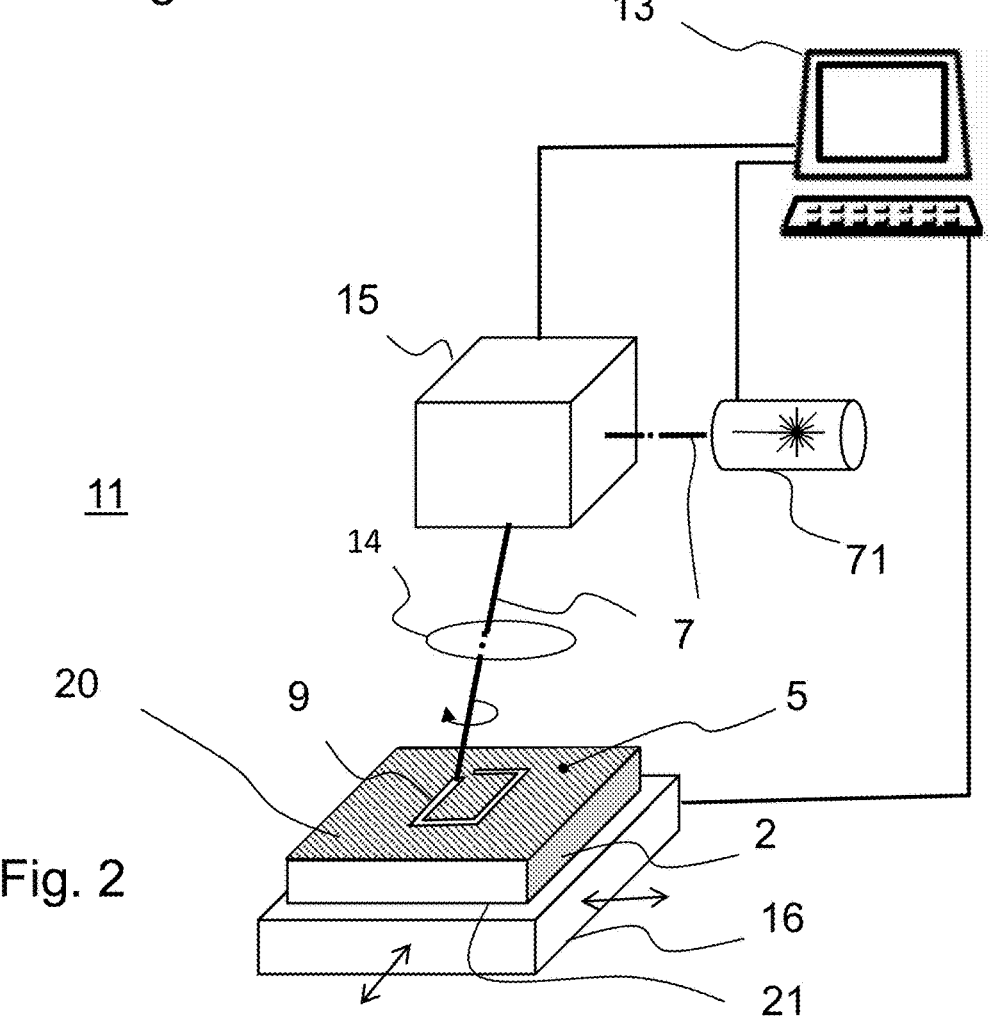
FIG. 2 shows an apparatus for laser ablation for producing a glass or glass ceramic article according to the invention.

As illustrated in FIG. 2, means for displacing the glass or glass ceramic substrate 2 may be provided alternatively or in addition to a galvanometer scanner. Particularly suitable for this purpose is an X-Y table 16, also referred to as a cross table. In such an embodiment, the laser beam 7 can be fixed and the opening 9 with the desired shape may be introduced into the coating 5 by moving the X-Y table with the glass or glass ceramic substrate 2 arranged thereon. For producing long homogeneous linear openings 9 and at the same time maintain high accuracy, it is also possible to use a synchronized scanning and displacing apparatus which synchronizes the movement of table 16 or another means for displacing substrate 2 with the deflection of the scanner, such as galvanometer scanner 15.

For focusing the laser beam 7 on the surface in order to achieve the highest possible intensity, an appropriate focusing optical system 14 may be provided. In the example shown in FIG. 2, this focusing optical system is arranged downstream of galvanometer scanner 15. However, it will be apparent to those skilled in the art that other configurations are likewise possible, which are suitable to focus the laser beam 7 onto the glass or glass ceramic substrate 2. In order to achieve short focal lengths, it is favorable to arrange the focusing optical system behind the galvanometer as seen in the beam direction. Generally, regardless of the specific configuration of the optical system and the displacement mechanism as shown in the example of FIG. 2, a focusing optical system, in particular a lens or group of lenses or a focusing mirror with a focal length of less than 300 mm is preferred.

For locally removing the coating 5 to create an opening 9 which extends through coating 5, the device for guiding the laser beam moves the laser beam 7 over the surface, and the laser 7 is adjusted so that the ablation threshold of the material of coating 5 is exceeded and thus the coating is removed at the point of impingement. However, the output power of the laser is adjusted so that the ablation threshold of the substrate material, that means the material of the glass or glass ceramic of substrate 2, is not reached so that only the coating is removed. The glass ceramics sold under tradenames ROBAX and CERAN CLEARTRANS may be mentioned as an example here. For these glass ceramics the ablation threshold for a laser wavelength of 1064 nm is approximately $5.2*10^{17}$ W/m$^2$.

Generally, without limitation to the specific exemplary embodiment discussed above, it is therefore advantageous when the materials of the glass or glass ceramic material and of the opaque coating are selected so that the ablation threshold of the material of the glass or glass ceramic substrate 2 is higher than the ablation threshold of the opaque coating 5, in particular in the infrared spectral range, more particularly at a wavelength of 1064 nm.

Particularly preferably the opening 9 has a linear shape, without being limited to the illustrated example. In other words, the opening 9 has the shape of a trench in this case. Such a line or trench may have a closed form, that means it may generally be annular or have the shape of a frame.

Furthermore, it is generally advantageous if the layer thickness of the opaque coating is not too high. This facilitates the removal by laser ablation on the one hand. On the other hand, this is advantageous for light transmission through the opening 9 in the coating. If the coating is too thick, the walls of the opening will be correspondingly long and will swallow an unnecessary amount of light. Therefore, it is generally preferred that the opaque coating 5 has a layer thickness of not more than 300 μm, most preferably not more than 160 μm.

On the other hand, however, coatings that are too thin are also unfavorable, in particular in order to ensure sufficient light blocking. Preference is given to layer thicknesses of more than 10 μm, preferably at least 50 μm. The minimum and maximum thicknesses specified above are average values of layer thickness.

The laser beam guiding means are controlled by a control device 13 which may for instance execute a program that translates the shape and location of the pattern feature into control signals by means of which the laser beam 7 is moved over the surface by the laser beam guiding means. Preferably, the control device also controls the laser 7, in particular with regard to switching on and off and laser intensity.

In one exemplary embodiment, a pulsed laser 71 was selected which can be sufficiently well focused to ablate tracks with a width of 0.02 mm. This was achieved with a neodymium-YAG laser of a wavelength of 1064 nm and a pulse length of 10 ps. A scanner with an optical system with a focal length of 255 mm was employed. The $M^2$ factor is less than 1.4. The beam had a diameter of 12 mm. Average output power W50 at 20% was about 10 W. Other lasers may also be used. However, it is advantageous in any case that the width of the ablated features is less than 0.025 mm.

Figure 3:
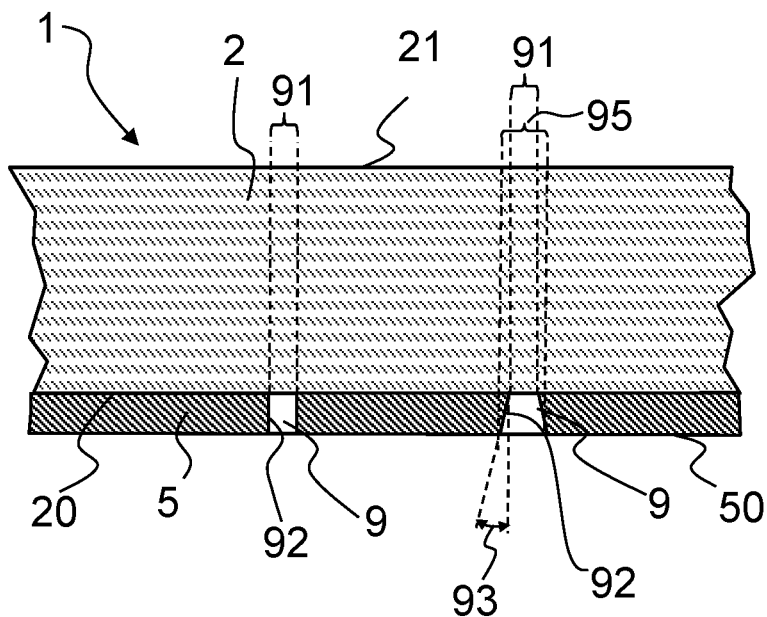
FIG. 3 shows a glass or glass ceramic article produced by the method.

FIG. 3 is a schematic cross-sectional view of a glass or glass ceramic article 1 produced by the method according to the invention. An opening 9 has been introduced in the opaque coating 5. This opening has a width 91 of not more than 80 μm at the bottom of coating 5 or at the substrate surface exposed in the opening, preferably of not more than 40 μm, most preferably not more than 30 μm or even not more than 25 μm.

In the example shown on the left in FIG. 3, the wall 92 of opening 9 is substantially perpendicular. According to a further embodiment, opening 9 may taper from the surface 50 of the coating toward the glass or glass ceramic substrate 2. One exemplary embodiment of this case is illustrated by the opening 9 on the right side in FIG. 3. Such an embodiment may be advantageous for introducing an opening even into rather thick coatings 5 by multiple or stepwise ablation. Preferably, however, the angle 93 between the wall 92 of opening 9 and the surface normal of the substrate is smaller than 20°, preferably smaller than 15°. This angle is the average angle of the wall which can be easily determined trigonometrically from the ratio of the width 91 of the opening at the substrate and the width 95 at the surface of coating 5, and from the thickness of the coating 5. Accordingly, the following applies to the thickness D of the coating 5 and the difference B of widths 95, 91 of this embodiment: $B/2D \leq \tan(20°)$, preferably $B/2D \leq \tan(15°)$.

According to yet another embodiment, with the preferred layer thicknesses and the maximum width 91 of the opening at the substrate according to the invention, a condition is generally met in accordance to which the width 91 of opening 9 is smaller than the layer thickness of the opaque coating 5.

Both the smaller width of the opening compared to the thickness and the small angle of the wall 92 to the vertical, if any, imply that already when looking at the opening 9 slightly obliquely, the visual axis will not pass through the opening 9 but will end at wall 92, which in conjunction with the small width 91 of the opening results in the fact that the opening remains invisible to a viewer. It can only be perceived when light from a light source on the side of the glass or glass ceramic article 1 that is hidden to the viewer due to the light blocking layer 5 passes through the opening.

However, laser ablation may cause a dark discoloration of the coating. If the coating itself is dark, such discoloration and hence the opening 9 will remain invisible. However, for coatings having a light color this is different. In this case, the dark discoloration may be visible at the edges of the opening 9. This can be counteracted by adjusting the pulse frequency of the laser and the speed at which the laser beam is directed over the coating such that the points of incidence of the laser pulses do not overlap each other. However, it is not possible to create a trench-shaped opening 9 in this manner, since first only consecutively stringed pits are ablated. To create a trench, the portion of the coating to be removed is then passed several times. According to this embodiment of the invention, it is thus even possible to produce openings invisible for a viewer in an opaque coating that has a color with an L value in the L*a*b color space of at least 20, preferably at least 40, more preferably at least 50. The L value of the color of the opaque coating may for example be determined using a spectrophotometer. The value refers to an exposed surface of the coating 5, that means it is not a color value measured through the glass or the glass ceramic.

According to one refinement of the invention, a top-hat profile of the laser beam 7 is used in order to minimize the thermal impact in the edge region of the opening to be produced so as to avoid the darkening effect. In this case, the edge regions of the initially Gaussian beam which have not enough energy for ablating the coating but yet have enough energy to heat the coating to an extent to cause discoloration thereof, are eliminated. Another advantage of a top-hat profile is better contour sharpness, since a Gaussian profile does not permit to remove multilayer systems with sharp contours, although this effect causes blurs in the micrometer range that are hardly visible or not visible at all to the eye.

Particularly preferably, the invention is applied so that the coating is deposited on the surface 20 of the glass or glass ceramic substrate 2 that faces away from the user. Accordingly, the light from a light source will therefore first pass the coating through opening 9, then the glass or glass ceramic substrate and will then exit from the opposite surface 21.

The invention can be employed in many ways for backlit glass or glass ceramic articles of household appliances. The invention is particularly suitable for cooktops. A control panel, for example on a stove or oven, may also be implemented using a glass or glass ceramic article according to the invention. In case of a household appliance, the opaque coating serves to create a certain visual appearance on the one hand, on the other to hide the components of the household appliance.

Generally, without being limited to the exemplary embodiments described below, the invention relates to a household appliance which has an operating surface that is defined by the glass or glass ceramic article, and which comprises at least one light-emitting element that is arranged in the interior of the household appliance so that light emitted from the light-emitting element impinges to the opening 9 in the opaque coating 5 and can pass through the opening 9 and the substrate 2.

Figure 4:
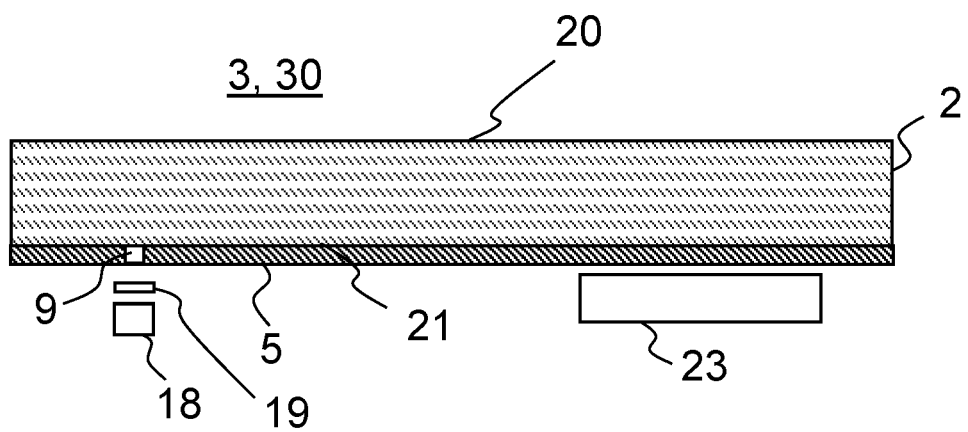
FIG. 4 shows a glass ceramic cooktop comprising a glass ceramic article according to the invention as a cooking plate.

FIG. 4 shows an example of a preferred embodiment of such a household appliance 3 in the form of a glass ceramic cooktop 30, the cooking plate of which is formed by a glass ceramic article 1 according to the invention.

Regardless of the type of household appliance 3, the opaque coating 5 is preferably applied on the inside surface 20 of the glass or glass ceramic substrate 2. In the example of glass ceramic cooktop 30, the opaque coating 5 is accordingly provided on the lower surface of the substrate, which accordingly is a glass ceramic substrate 2 in this case. One or more heating elements 23 are arranged below the glass ceramic substrate 2, for heating food to be cooked or cookware placed on the cooking plate or surface 21. For example, the heating elements 23 may comprise induction coils for an induction cooker.

Without limitation to the illustrated exemplary embodiment, a light-emitting diode is used as the light-emitting element 18. Depending on the design of the opening, an assembly with a plurality of light-emitting diodes 18 may be used as well. The latter is favorable, for example, when the opening 9 is elongated and is to be illuminated as uniformly as possible. According to yet another embodiment of the invention, it is also possible to use a laser diode as the light-emitting element, in order to provide for much light to pass through the small opening.

Generally, without being limited to the illustrated example, it may moreover be favorable that a diffusing element 19 is arranged in front of light-emitting element 18. Diffusing element 19 extends along a trench-shaped opening 9 and ensures that the light from light-emitting element 18 is distributed more evenly along trench-shaped opening 9. In this manner, a more uniform illumination of the linear display feature created with such a trench-shaped opening 9 is achieved.

The display feature created by the illuminated opening 9 may for instance serve to mark a cooking zone. Such marking is used to indicate which one of the cooking zones is currently enabled and heated. For this purpose, the trench-shaped opening 9 may for instance extend annularly around the area heated by heating element 23.

Figure 5:
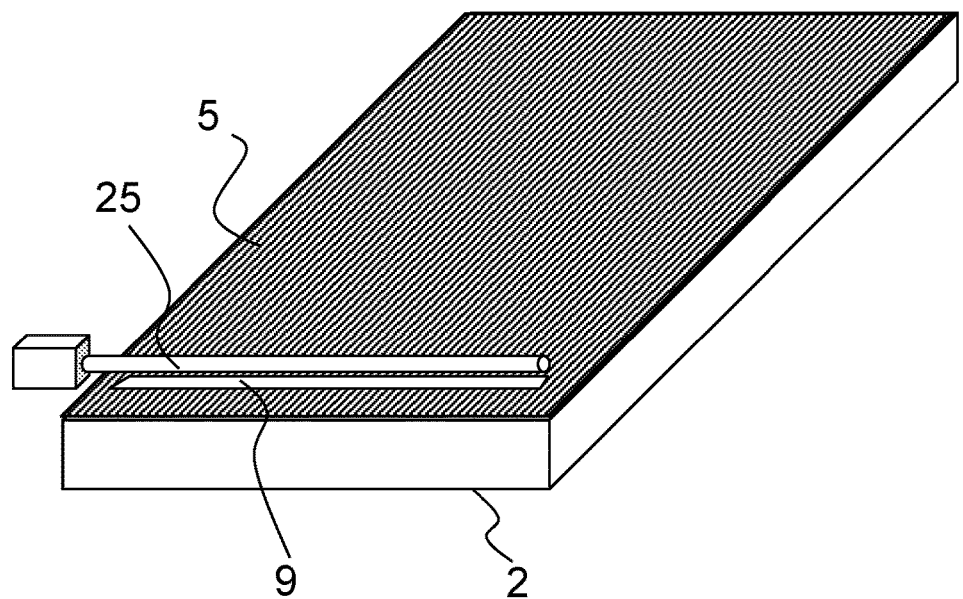
FIG. 5 shows an embodiment with a side-emitting light guide for illuminating the opening.

Besides a diffusing element 19, a side-emitting light guide is suitable as well for distributing the light emitted by light-emitting element 18 along opening 9. FIG. 5 shows an example. Again, opening 9 has a trench-like shape, so that when light passes through the opening 9, the impression of a line-shaped display feature is created. A side-emitting light guide 25 extends along opening 9, which is optically coupled to light-emitting element 18 so that the light from light-emitting element 18 is injected into light guide 25. Light guide 25 emits the injected light in distributed manner along its longitudinal extension and therefore also in distributed manner along the trench-shaped opening 9, so that opening 9 is uniformly illuminated. Besides a light-emitting diode as the light-emitting element, a laser diode is suitable for this embodiment as well. With such a laser diode, high light intensity can be injected even into a thin light guide. The latter can be arranged close to the opening so that the light can be efficiently directed to the opening. Regardless of the type of light source, the embodiment with a side-emitting fiber is also suitable for guiding light into regions that are strongly heated during operation of the household appliance, since in this case the light-emitting element itself need not be located in the heated region. In this way it is possible, among other things, to provide light-emitting display features within a cooking zone.

Generally, a coating on a glass or glass ceramic substrate may not only serve to prevent transparency. In addition, a coating may also be advantageous for sealing the coated side of the substrate. In the region of opening 9, such a sealing layer would however be interrupted. According to one embodiment of the invention, if a transparent sealing layer is used, it can as well be applied after introducing the opening 9, so as to cover or close the opening. The light from the light-emitting element will still be able to pass through opening 9 across the transparent sealing layer.

Figure 6:
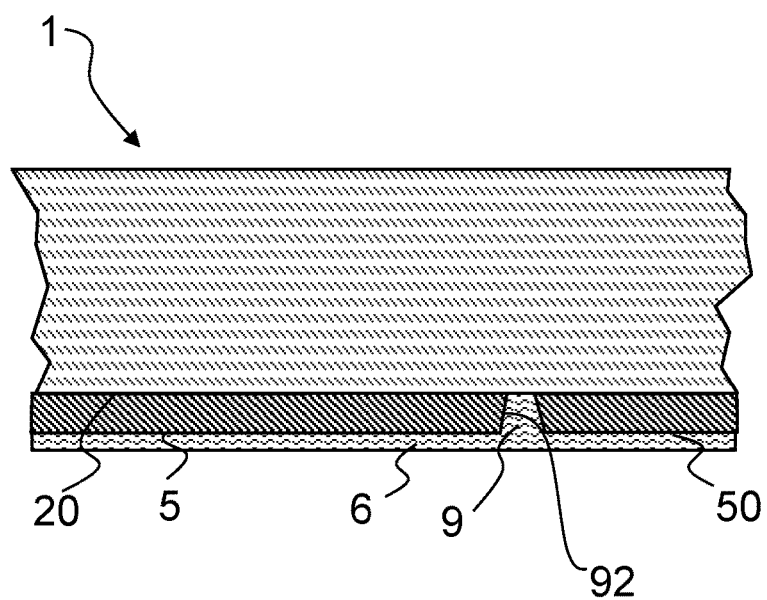
FIG. 6 shows a refinement of the embodiment illustrated in FIG. 3.

Such a refinement of the invention, in which opening 9 is sealed by a transparent sealing layer 6 is shown in FIG. 6. The sealing layer may cover the opening 9 and/or even fill the opening, as illustrated. Suitable for sealing layer 6 are for instance transparent silicone layers, silicone-based layers and transparent sol-gel layers. Furthermore, it is also possible with such a sealing layer to fix a diffusing element 19 or a side-emitting light guide or even the light-emitting element in the vicinity of the opening.

A sealing layer as represented by layer 6 refers to a coating which protects the glass or glass ceramic material and/or the opaque coating 5 from environmental influences. Such environmental influences may for instance include condensation products. Therefore, the sealing layer should be impermeable to liquid- and oil-containing substances as included in food, for example. If such substances should penetrate into coating 5, this might cause visible, unattractive changes in visual appearance.

Moreover, the opaque coating 5 itself may constitute a sealing layer for protecting the surface of the glass or glass ceramic covered by coating 5.

Besides lighting that is not visible in the off state, another application is to create an invisible label which serves as a flag against counterfeits. If it is desired to determine if a particular glass or glass ceramic article is a genuine product, this can then be easily verified by examining the article under back lighting. Therefore, according to one aspect of the invention, it is contemplated to use a marking in the form of a preferably linear opening 9 in the opaque coating 5 as produced according to the invention for labeling the origin of the glass or glass ceramic article.

LIST OF REFERENCE NUMERALS

1 Glass or glass ceramic article
2 Sheet-like glass or glass ceramic substrate
3 Household appliance
5 Opaque coating
6 Sealing layer
7 Pulsed laser beam
9 Opening in 5
11 Apparatus for laser ablation
13 Control device
14 Focusing optical system
15 Galvanometer scanner
16 X-Y table
18 Light-emitting element
19 Diffusing element
20, 21 Face of 2
23 Heating element
25 Side-emitting light guide
30 Glass ceramic cooktop
50 Surface of 5
71 Laser
91 Width of 9 on substrate 2
92 Wall of 9
93 Angle of wall 92 relative to the surface normal of the substrate
95 Width of opening 9 at surface 50 of 5

What is claimed is:

1. A glass or glass ceramic article, comprising:
    a glass or glass ceramic substrate having two opposite faces, the substrate exhibiting, in a visible spectral range from 380 nm to 780 nm, a light transmittance of at least 1% for visible light that passes between the two opposite faces;
    an opaque sol-gel coating on a first of the two opposing faces, the opaque sol-gel coating exhibiting, in the visible spectral range, a light transmittance of not more than 5%; and
    an opening provided in the opaque sol-gel coating, the opening allows light that is incident on a surface of the opaque sol-gel coating to pass through the opaque sol-gel coating and the substrate, the opening having a width of not more than 80μm, wherein the substrate has an ablation threshold, in an infrared spectral range, that is higher than an ablation threshold of the opaque sol-gel coating.

2. The glass or glass ceramic article as claimed in claim 1, wherein the light transmittance of the substrate in the visible spectral range is at least 30%.

3. The glass or glass ceramic article as claimed in claim 1, wherein the width of the opening is not more than 25 μm.

4. The glass or glass ceramic article as claimed in claim 1, wherein the width of the opening is at least 0.5 μm.

5. The glass or glass ceramic article as claimed in claim 1, wherein the width of the opening is smaller than a thickness of the opaque coating.

6. The glass or glass ceramic article as claimed in claim 1, wherein the opening has a closed form.

7. The glass or glass ceramic article as claimed in claim 6, wherein the closed form is annular or a linear frame.

8. The glass or glass ceramic article as claimed in claim 1, wherein the opening comprises a linear opening that labels an origin of the glass or glass ceramic article.

9. The glass or glass ceramic article as claimed in claim 1, wherein the opening tapers from the surface of the opaque sol-gel coating toward the substrate.

10. The glass or glass ceramic article as claimed in claim 9, wherein the taper has an angle between a wall of the opening and a surface normal of the substrate that is less than 20°.

11. The glass or glass ceramic article as claimed in claim 10, wherein the angle is less than 15°.

12. The glass or glass ceramic article as claimed in claim 1, wherein the opaque sol-gel coating comprises a matrix of an oxidic network with decorative pigments embedded therein.

13. The glass or glass ceramic article as claimed in claim 1, wherein the opaque sol-gel coating has a color with an L value in the L*a*b color space of at least 20.

14. The glass or glass ceramic article as claimed in claim 1, wherein the opaque sol-gel coating has a color with an L value in the L*a*b color space of at least 50.

15. The glass or glass ceramic article as claimed in claim 1, further comprising a sealing closing the opening.

16. A household appliance, comprising:
    an interior;
    an operating surface comprising the glass or glass ceramic article as claimed in claim 1; and
    at least one light-emitting element arranged in the interior so that light emitted from the at least one light-emitting element impinges on the opening in the opaque sol-gel coating and passes through the opening and the substrate.

17. The household appliance as claimed in claim 16, wherein the opaque sol-gel coating faces the interior.

18. The household appliance as claimed in claim 16, wherein the at least one light-emitting element comprises a light-emitting diode or a laser diode.

19. The household appliance as claimed in claim 16, further comprising a diffusing element or a side-emitting light guide for distributing the light emitted by the light-emitting element along the opening.

20. A glass or glass ceramic article, comprising:
    a glass or glass ceramic substrate having two opposite faces, the substrate exhibiting, in a visible spectral range from 380 nm to 780 nm, a light transmittance of at least 1% for visible light that passes between the two opposite faces;

an opaque coating on a first of the two opposing faces, the opaque coating exhibiting, in the visible spectral range, a light transmittance of not more than 5%; and an opening provided in the opaque coating, the opening allows light that is incident on a surface of the opaque coating to pass through the opaque coating and the substrate, the opening tapering from the surface of the opaque coating toward the substrate.

* * * * *